No. 860,203. PATENTED JULY 16, 1907.
A. C. FIELDS.
DIRT SCRAPER.
APPLICATION FILED FEB. 20, 1906.
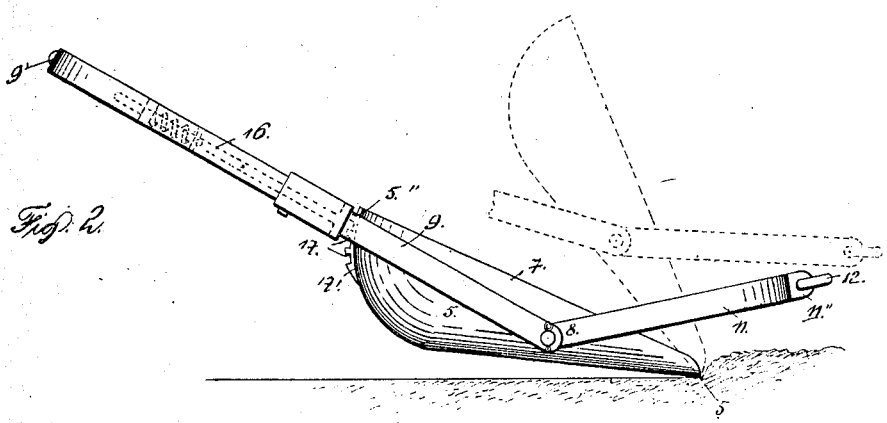
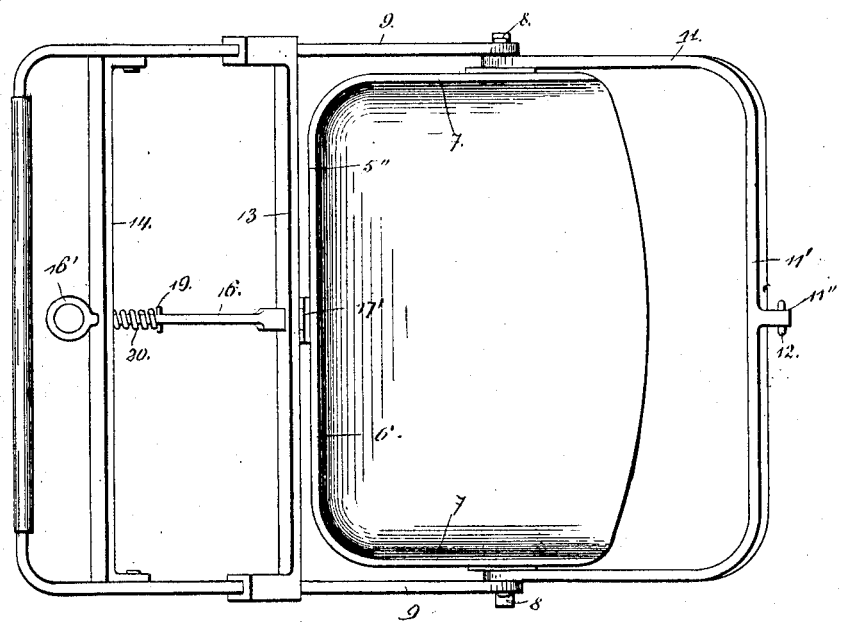

UNITED STATES PATENT OFFICE.

ARTHUR C. FIELDS, OF LITTELL, WASHINGTON.

DIRT-SCRAPER.

No. 860,203.

Specification of Letters Patent.

Patented July 16, 1907.

Application filed February 20, 1906. Serial No. 302,008.

*To all whom it may concern:*

Be it known that I, ARTHUR C. FIELDS, a citizen of the United States, residing at Littell, in the county of Lewis and State of Washington, have invented certain new and useful Improvements in Dirt-Scrapers, of which the following is a specification, reference being had therein to the accompanying drawings, in which—

Figure 1 is a plan view of a scraper embodying my invention; and Fig. 2 is a side elevation of the same.

The object of this invention is to produce improvements in the construction of dirt-scrapers whereby they may be conveniently controlled by an attendant in both their filling and dumping operations.

To these ends the invention consists in the novel construction, adaptation and combination of parts as will be hereinafter described and particularly pointed out in the appended claims.

In the said drawings, the reference numeral 5 designates the scraper bowl, or pan, provided with a rear wall 6 and side walls 7, as ordinary.

Rigidly connected to the latter, and intermediate their lengths, are outwardly projecting trunnions 8 in axial alinement with each other. Respectively connected to these trunnions are the front and rear ends of the handle-bar 9 and the draft bar 11. Each of these bars are desirably of a U-shape and the transverse member 11' of the draft bar is at such a distance from the pivotal connections as to allow the pan to be rotated about the latter without interference with such member. Devices, such as a lug 11'' and a link 12, are provided upon the draft bar for connecting the draft animals thereto. The said handle bar extends to some distance to the rear of the pan and has its transverse portion 9' formed cylindrical to furnish a smooth gripping surface for the attendant's hand or hands. Intermediate the bar part 9' and the pan are cross bars 13 and 14 which are apertured at 15 for the insertion of a latch rod 16 having at its rear end an eye 16' and its other extremity flattened for the purpose of registering with any of the notches 17 of a rack plate 17' fixedly secured to the back wall 6 of the pan.

Interposed between the bar 14 and a fixed pin 19, or its equivalent, upon the latch rod is a spring 20 tending to press the rod into engagement with any of the notches 17 which may be presented and according to the inclination desired to be given the handle-bar relatively to the pan. As in other scrapers, the pan is filled by being dragged forwardly through an advance movement of the team with a proper inclination of the pan to cause the cutting edge 5' to enter the ground; and, similarly, when loaded the handle-bar is lowered to remove the cutting edge out of action and the apparatus is thus dragged to the dumping place. Instead, however, of dumping the load by manual labor, with my invention all that is required is for the attendant to elevate the handle-bar sufficiently to re-engage the pan edge 5' with the ground when, upon the pan being released from the latch rod, by a continued forward movement of the team the pan is tilted about its engaged edge into the position indicated by the broken lines in Fig. 2 and continued there-beyond to deposit the load and be in a reversed position. The pan then being upside down is reversed into its normal position by the progression of the team causing the rear edge 5'', which is now in advance, to be engaged with the ground and which serves as the tilting fulcrum. After the pan has been brought back to its original position, the latch is re-engaged therewith when the scraper is again ready to be filled.

Having described my invention, what I claim as new and desire to secure by Letters-Patent, is—

1. In a scraper, the combination with the handle-bars and the draft-bar, of a pan rotatably connected to both of said bars, and manually operated locking means comprising a spring-pressed rod carried between the handle-bars, and a plate provided with a series of ratchet teeth carried by the back of the pan thereby forming means by which the handle of the scraper is adjustably locked, substantially as set forth.

2. In combination with the handle-bars of a dirt scraper, a rod slidably mounted between said handle-bars, a fixed pin passing through said rod, and a coiled spring surrounding said rod, one end of said spring bearing against said fixed pin, the other end of said spring bearing against the cross-bar or brace of the handle-bars and a ratchet toothed plate carried by the back of the pan and forming means whereby said handle is adjustably locked, substantially as set forth.

In testimony whereof I affix my signature in presence of two witnesses.

ARTHUR C. FIELDS.

Witnesses:
 PIERRE BARNES,
 ANGUS W. YOUNG.